April 14, 1959  A. L. ISLEY  2,881,768
APPARATUS FOR STEMMING TOBACCO
Filed March 22, 1957  3 Sheets-Sheet 1
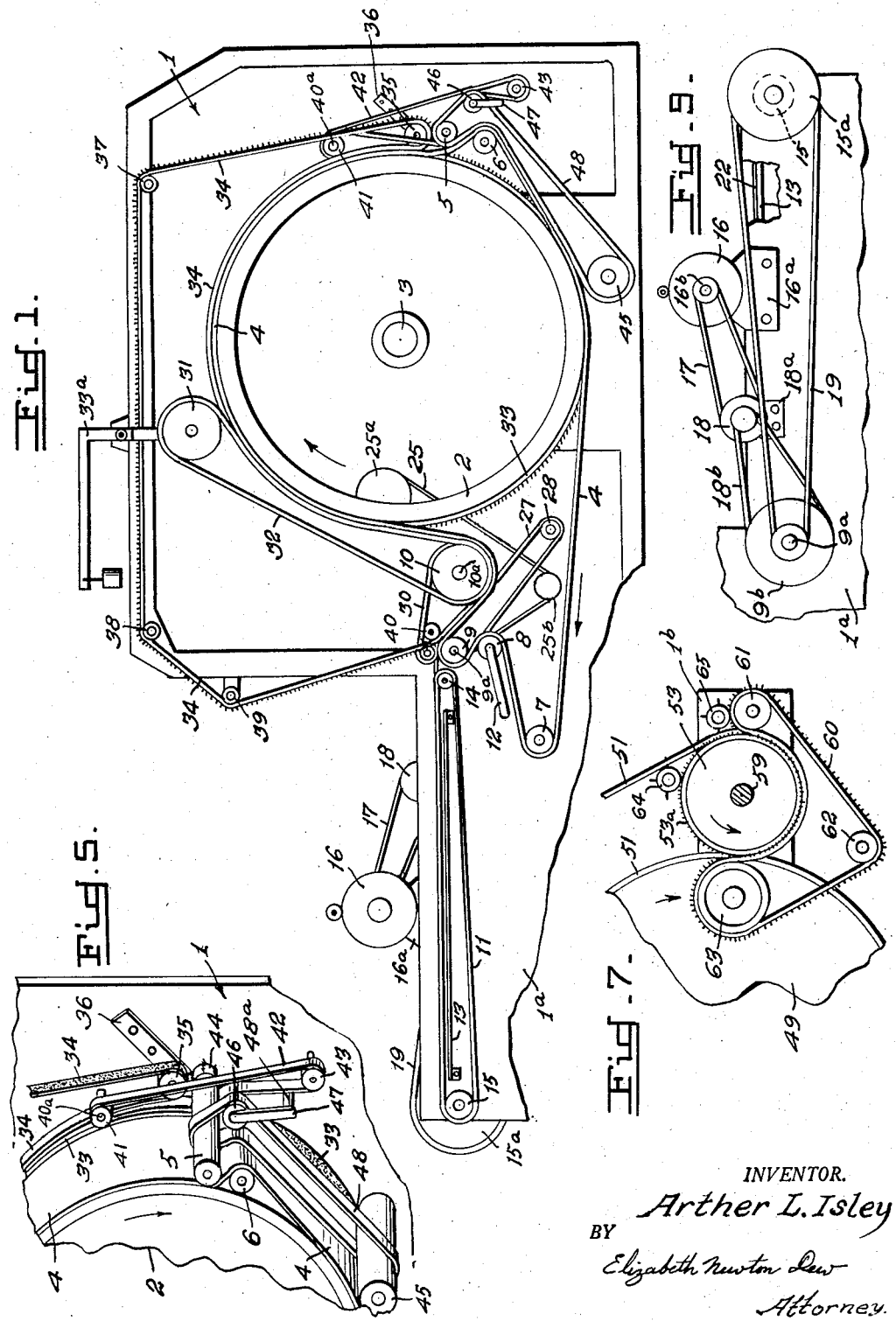
INVENTOR.
Arther L. Isley
BY
Elizabeth Newton Dew
Attorney.

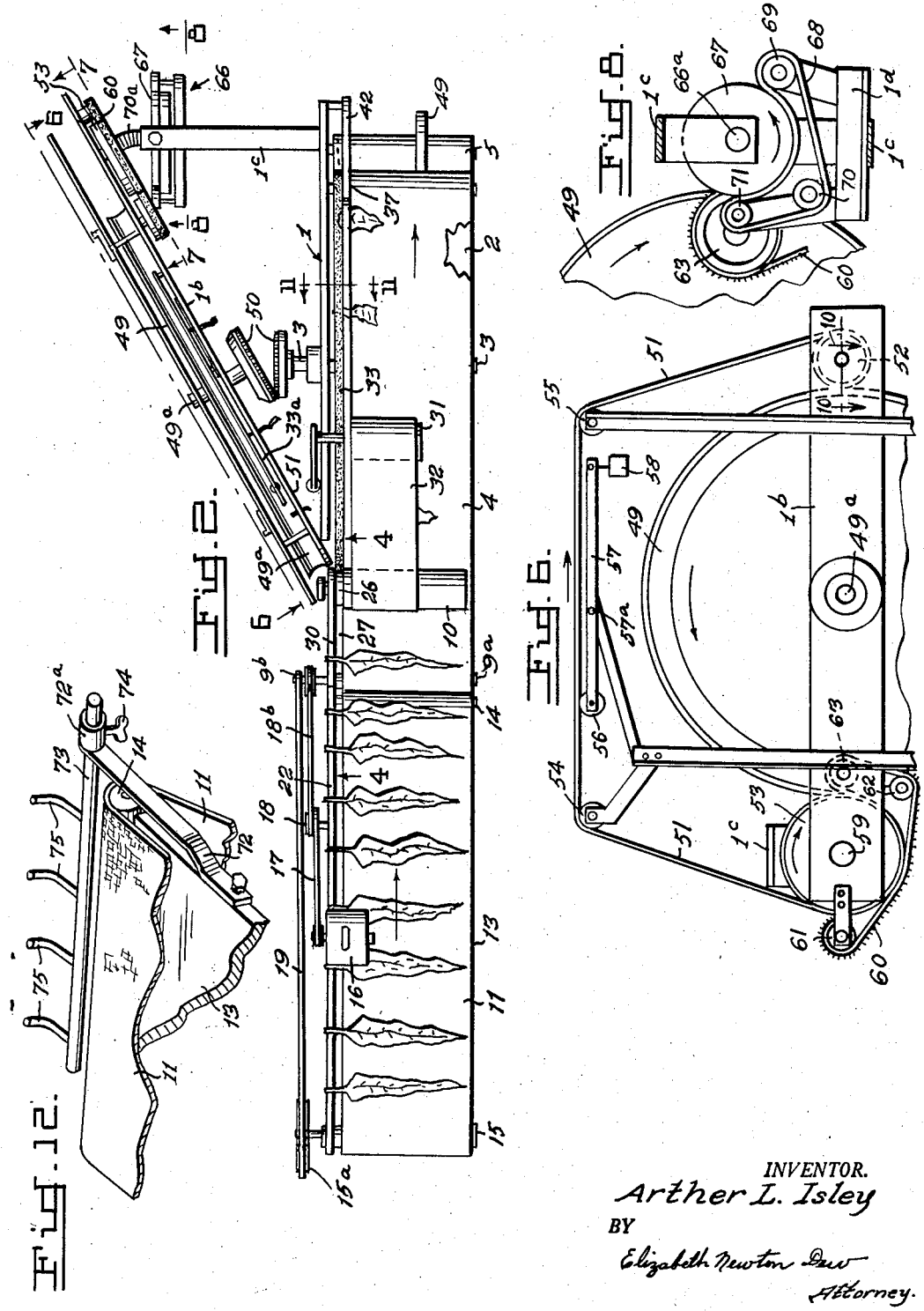

April 14, 1959 A. L. ISLEY 2,881,768
APPARATUS FOR STEMMING TOBACCO
Filed March 22, 1957 3 Sheets-Sheet 3
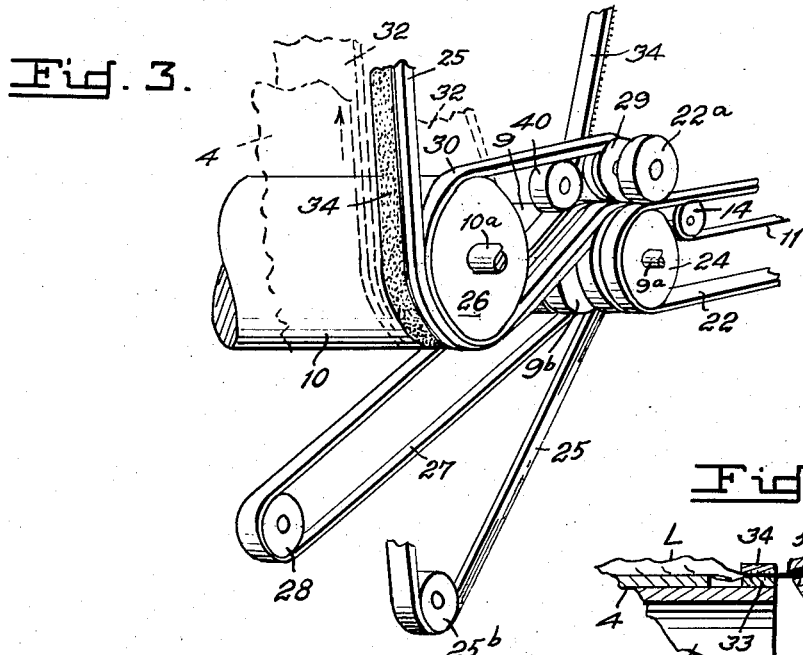
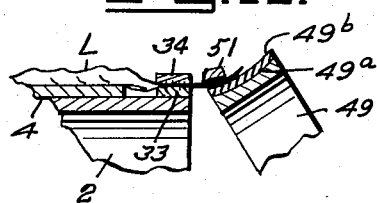
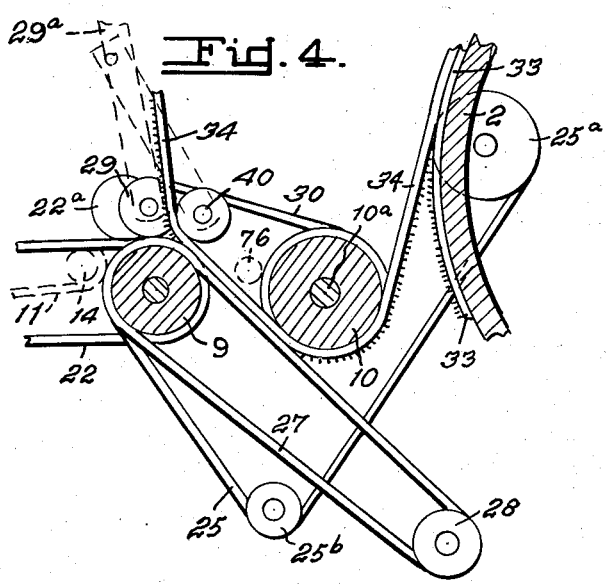
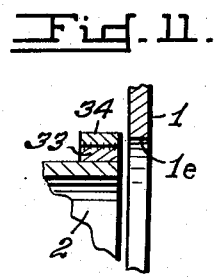
INVENTOR.
Arther L. Isley
BY
Elizabeth Newton Dew
Attorney.

United States Patent Office 2,881,768
Patented Apr. 14, 1959

2,881,768
APPARATUS FOR STEMMING TOBACCO
Arther L. Isley, Richmond, Va.
Application March 22, 1957, Serial No. 647,811
10 Claims. (Cl. 131—126)

In my Patent 2,557,540, dated June 19, 1951, I have disclosed a machine for stemming tobacco leaves. In this machine, the operator takes a hand of leaves and spreads them out upon the horizontal pass of a relatively slowly moving conveyor belt, with the stem ends of the leaves extending in the same direction transversely of the belt and in alignment or abutment with a vertical flat gauging or positioning surface.

As the leaves pass off the delivery end of the belt, they are fed to and gripped between the contacting surfaces of two narrow belts moving at a speed which is much greater than that of the conveyor belt. The two belts pass upwardly over and about a large stripping drum and the leaves are carried therewith about the drum for approximately 180° of angular movement thereof.

A second or stemming drum which preferably has the same diameter as the stripping drum, is journaled in the frame of the machine with its axis horizontally coplanar with that of the stripping drum. The two drums rotate in respective planes related at an acute angle and their peripheries are closely adjacent at about the point where the aforesaid belts begin their travel about the stripping drum and are driven in synchronism in the same direction of rotation. At this point a narrow stemming belt is guided into contact with the peripheral edge of the stemming drum next to the stripping drum, so that the free protruding ends of the stems are gripped between the stemming drum and belt. As the drums rotate the stems are pulled from the leaf portions which continue about the stripping drum until released to a chute or conveyor by separation of the two belts of cardcloth.

The machine covered by my patent identified is fast and efficient in operation, but since the usable leaf portions of the tobacco extend to the butt ends of the stems, machines of this type unavoidably have heretofore left a residue of usable leaf attached to the butt ends of the stems as they are pulled out.

It is therefore an object of this invention to provide a machine of the type described, which removes the aforesaid residue leaf portions from the stems and collects them for use.

Another object is to provide an improved machine of this type wherein the leaves are fed to the machine positively and accurately from a relatively slow-moving feed belt to a much more rapidly moving stemming mechanism whereby no great separation of the leaves is required as they are placed upon the feed belt, while at the same time they are properly spaced upon and about the drums.

Another object is to provide a tobacco stemming machine wherein the butt ends of the stems are firmly gripped to the stemming drum without, however, unduly bending or breaking them.

A still further object is to provide a machine of the character stated, in which the tobacco leaves whose stems have not been properly placed upon the feed belt and hence not stemmed, are separated from the stemmed tobacco so that they can be easily collected and re-run through the machine.

A further object is to provide a machine for stemming tobacco which saves practically all of the usable leaf.

A further object is to provide, in a tobacco stemming machine, a feed mechanism which assures that the leaves are conveyed smoothly, evenly and uniformly, in proper position, to the pick-up belts and subsequently to the stemming mechanism.

Another object is to provide a tobacco stemming machine which is fast, efficient, reliable in operation, capable of mass production and which, being largely automatic, does not require skilled labor for its operation and effects large savings in operating costs.

Other objects and advantages of the invention will become obvious after a study of the following description in connection with the accompanying drawing.

In the drawing:

Figure 1 is a side elevation of a machine embodying the invention;

Figure 2 is a plan view corresponding to Figure 1 but with the cardcloth belt omitted for clarity of illustration;

Figure 3 is a perspective view to an enlarged scale, of the belt mechanism for transferring tobacco leaves from the feed belt to the stripping and stemming drums;

Figure 4 is a sectional detail view corresponding to Figure 3 and taken in a plane identified by line 4—4, Figure 2, showing the mechanism by which the leaves are transferred from the feed belt to the drums;

Figure 5 is a detail perspective view of the forward side of the stripping drum and the means associated therewith for separating the stemmed leaves from any which remains unstemmed;

Figure 6 is an elevational view as indicated by the line 6—6, Figure 2, showing the stemming drum and part of the means for stripping residue leaf portions from the stems;

Figure 7 is a sectional detail view taken in a plane identified by line 7—7, Figure 2, showing details of the mechanism for stripping residue leaf portions from the butt ends of the stems;

Figure 8 is a sectional view taken in a plane identified by line 8—8, Figure 2, showing details of the mechanism for gripping the stems as they pass from the main stemming drum;

Figure 9 is a view from the back side of the feed table showing the power drive to the various parts of the machine;

Figure 10 is a detail sectional view on line 10—10, Figure 6, showing the relation of the main stripping drum and stemming drum at their point of nearest approach;

Figure 11 is a detail sectional view on line 11—11, Figure 2, showing the manner in which the frame may act as an abutment for the outer cardcloth belt; and Figure 12 is a detail perspective view to an enlarged scale, of the feed belt and the means for effecting uniform transfer of leaves to the pick-up mechanism.

Referring in detail to the drawing, 1 identifies generally the frame of the machine which may comprise heavy steel plates or bars for rigidly mounting at one end, the shafts upon which the drums and guide pulleys are mounted or journaled.

A large stripping drum 2 is fixed on a shaft 3 journaled at one end in frame member 1, for rotation upon a horizontal axis. Drum 2 is preferably built up from wood or metal sections and has a smooth cylindrical periphery of a width ample to contact and support the tobacco leaves in their passage thereabout. In the model shown, this width is about sixteen and one-half inches.

A flat endless belt 4 has a width a little less than that of the drum, fourteen inches as shown, and is guided about the upper half of the drum in such a manner as to leave a space of about two and one-half inches between the belt and the inner peripheral edge of the drum, for the accommodation of a cardcloth belt subsequently described.

Referring particularly to Figure 1, belt 4 after passing upwardly over and about drum 2 for about 180°, passes outwardly beneath pulley 5 and over pulley 6, thence rearwardly beneath and in contact with the lower peripheral portion of the drum, rearwardly to and about an idler 7. From idler 7 the belt passes forwardly beneath a tightening idler 8, rearwardly and upwardly over a pick-up pulley 9 and thence forwardly and downwardly beneath a larger guide pulley 10 and again upwardly over and about the drum. Pulleys 5, 6, 7 and 10 are journaled on heavy shafts rigidly fixed at their inner ends only in the frame of the machine. Pulley 9 is a driver and is fixed to its shaft, which is journaled at one end in frame 1. It is noted that pulley 9 is positioned closely adjacent the delivery end of a feed belt 11, presently described. Pulley 8 is supported at its ends by parallel links, one of which is identified at 12, Figure 1, and weighted or spring-urged by means not shown, to maintain belt 4 taut about the drum.

The feed belt 11 may be substantially as described in my prior patent previously identified, so that it is sufficient to identify feed table 13 rigidly carried by frame portion 1a and a little greater in width than the corresponding dimension of belt 11, which is conveniently of the same width as belt 4. Belt 11 is guided about a small pulley 14 at its forward end, journaled closely adjacent pulley 9, and a second pulley 15 at its rearward end, such that, when loaded with hands of tobacco, its top horizontal pass is in smooth sliding contact with the top of table 13 and is fully supported thereby.

Power to drive all parts of the machine is supplied by a motor 16 accessibly mounted on a bracket 16a, Figure 9, fixed with frame portion 1a. The motor drives a belt 17 which extends forwardly to and about a stepped idler pulley 18 journaled in bearings carried by bracket 18a. A second belt 18b extends from the small step of idler 18 to a large pulley 9b fixed on shaft 9a of pulley 9, thus driving belt 4. Pulley 9b has a smaller step driving, through belt 19, a large pulley 15a fixed to feed roller 15.

Due to the speed reduction thus obtained belt 11 is driven at a much lower linear speed than belt 4. Because of this, the operator who places the leaves upon the feed belt is not required to materially separate them as they are placed upon the belt since they are adequately spaced by the greater speed of the pick-up belts and mechanism subsequently described. Thus the operator can largely devote his attention to proper placement of the leaves transversely of the belt. A speed relation between belts 4 and 11 of about 8:1 is preferred although this ratio may be varied within reasonable limits.

A flat narrow belt 22 about one inch wide, passes over and along the inner edge of table 13 in parallel with feed belt 11. At its rearward end belt 22 passes about and is driven by pulley 15. At its forward end belt 22 extends about an idler 24 journaled on shaft 9a of pulley or roller 9. See Figure 3. Belt 22, while having its upper pass parallel with feed belt 11 and in spaced side-by-side relation therewith, extends forwardly beyond the adjacent end of the feed belt. Thus as the leaves pass off the feed belt, their stem ends remain supported on belt 22 and are transferred thereby to the pick-up mechanism now to be described.

The pick-up mechanism is best shown in Figures 3 and 4. As previously explained, belt 22 passes forwardly of the adjacent end of belt 11, about an idler 24 journaled upon the shaft 9a to which pulley 9 is fixed. A soft rubber disc 22a is journaled in a bracket not shown, but vertically and horizontally adjustable upon a convenient part of the frame. This disc contacts belt 22 at a point a little rearwardly of idler 24 and is driven by the belt. Next to idler 24 there is a V-belt pulley 9b fixed to shaft 9a. A V-belt 25 passes about this pulley, thence downwardly beneath an idler 26 on shaft 10a, upwardly about an idler 25a, Figure 4, positioned with its periphery tangent to that of drum 2, as shown, thence downwardly and rearwardly about an idler 25b and back to pulley 9b.

An idler 29 is journaled upon a bracket 29a shown in dotted lines in Figure 4 and fixed to an adjacent part of the frame. This idler is closely positioned over pulley 9b and a second V-belt 30 passes about pulleys 29 and 26. V-belts 25 and 30 are therefore in back-to-back contact in their passes from pulley 9b and idler 29, respectively, to and around idler 26.

Next to pulley 9b, a flat belt 27 extends around the contiguous end of pulley 9 thence downwardly beneath pulley 10, about an idler 28 back to pulley 9. A cardcloth belt 34, subsequently described in detail, passes downwardly beneath an idler 40 journaled upon the same bracket 29a as idler 29 and thence downwardly beneath an idler on shaft 10a next to idler 26, then upwardly to drum 2. The construction is such that the passes of belts 27 and 34 between pulley 9 and idler 40, respectively, to and beneath pulley 10, are in contact. Belt 25 is driven by pulley 9b and in turn drives belt 30 by its frictional contact therewith. Belts 25, 27, 30 and 34 therefore all travel at the same linear speed as belt 4, which speed is much greater than that of belts 11 and 22.

As shown in Figures 1 and 2, a pulley 31 is journaled in tightener mechanism 33a pivoted on the frame above drum 2. A flat belt 32 somewhat less in width than belt 4 passes about pulleys 10 and 31 so that it is interposed between pulley 10 and belt 4. Thus belts 4 and 32 pass upwardly together for a short distance about the drum. These belts are shown in dotted lines only upon Figure 3, for clarity of illustration.

In operation of this pick-up mechanism the operator spreads the leaves on feed belt 11 in closely spaced relation with the ends of the stems resting on the top run of belt 22 and generally in contact with a vertical gauging surface conveniently provided by frame plate 1a. As each leaf passes off the feed belt its stem end, which remains momentarily on belt 22, moves beneath disc 22a and is positively fed to and between the contacting passes of belts 25 and 30. As soon as it is engaged between these belts its speed is greatly increased and as it moves between the contacting passes of belts 27 and 34 it is also gripped therebetween and moves downwardly beneath pulley 10 where it travels between wide belts 4 and 32 and is carried thereby to drum 2. At this time, that is, during the passage of leaves from pulley 10 to drum 2, where they are secured to the respective drums by the stripping and stemming belts, the leaves are between belts 4 and 32 and are carried along thereby. At the same time, their stem ends extend beneath cardcloth belt 34 and above the adjacent pass of belt 25. In this way, any stems which are bent or crooken are held in position to be picked up by and between the stemming drum and its belt 51. As the leaves begin their travel about the drum, they are engaged and gripped, first between cardcloth belt 34 and the cardcloth facing 33 on the underlying peripheral edge of drum 2 and, secondly, between the stemming drum and its stemming belt, as presently described. The leaves are not required to be widely spaced upon the feed belt since their separation is greatly increased as they pass to the belts 25 and 30.

Cardcloth facing 33 is secured about the inner peripheral edge of drum 2, Figure 10, and it should be noted that there is a space of approximately two inches between the facing edges of belt 4 and facing 33 as the belt passes over and about the drum. The other edge of the facing is coincident with the edge of the drum. Any suitable means such as nails or screws may be used to removably secure the facing to the drum. From Figure 11 it will be noted that frame plate 1 has an arcuate cut-out whose edge is indicated at 1e. The radius of this edge is such that the edge lies midway between the outer and inner faces of belt 34 throughout the travel of the latter about the drum whereby the plate may act as an abutment for the belt under heavy side pull and prevent it from being pulled off the drum.

Cardcloth belt 34, Figure 1, is of the same width as facing 33 and is guided over and about the inner edge of the upper half of the drum and in contact with facing 33 over this portion of its travel. Belt 34 is omitted from Figure 2 to more clearly show parts therebeneath, including facing 33. After passing about the upper half of the drum, belt 34 goes about an idler 35, Figures 1 and 5, journaled in a bracket 36 secured to frame 1, thence upwardly and rearwardly about idlers 37 and 38, and downwardly about idler 39 to idler 40 of the pick-up mechanism previously described. At this point it passes into contact with belt 27, downwardly beneath and about roller 10 and again upwardly over and about the drum.

From Figure 2 it will be noted that the plane of cardcloth elements 33 and 34 is offset laterally (downwardly in the figure) from the plane of belt 22. Hence the ends of the stems project outwardly from these belts so that they can be gripped by the stemming mechanism. As the stemming mechanism, subsequently described, pulls out the stems, the leaf portions are held to the drum by the elements 33 and 34 and pass therewith for about 180° of rotation.

Referring particularly to Figure 5, idlers 41 and 43, journaled on shafts fixed in frame 1, guide a narrow delivery belt 42. As shown, one pass of this belt extends downwardly under pulley 5 and then outwardly over pulley 6 in parallel with the corresponding section of belt 4. Belt 42 is therefore in contact with drum 2 over this section, in the space between the contiguous edge of belt 4 and the superposed cardcloth elements 33 and 34, so that the stemmed leaves are held to the drum for a short distance after belt 34 passes out of contact with facing 33 as it turns upwardly about idler 35. This belt therefore prevents the stemmed leaves from adhering to belt 34 and moving outwardly therewith as it separates from the drum.

Pulley 5 has a belt-cleaning wheel or picker 44. A number of these pickers are used at various points throughout the machine. Each consists of a cylindrical body having a series of radially-projecting metal pins or bristles over an axial distance equal to the width of the cardcloth belts. These pins engage between the bristles of the belts and, in an obvious manner, operate to free the belts of particles of leaf adhering thereto.

A wide pulley 45, Figures 1 and 5, is journaled upon a shaft fixed at its inner end in the frame 1, at the lower portion of drum 2 and just out of contact therewith. A narrow flanged tightening idler or pulley 46 is journaled upon an arm 47 pivoted on a stud 48a and urged by weight or spring means, not shown, to maintain taut a flat narrow belt 48 which passes in sequence about pulleys 5, 46, 45 and 6 at or about the mid-portion of belt 4. Thus belt 48 travels in contact with belt 4 from its passage beneath pulley 5 to about the point where it passes above pulley 45. The idler 46 and its mounting arm are also made adjustable in a direction parallel with the axis of the drum to accommodate leaves of different sizes.

When a stem is properly gripped and pulled from the leaf, the latter is crumpled and drawn against the superposed cardcloth elements 33 and 34 and thus occupies a relatively narrow space on the drum contiguous to them. However, should the stemming mechanism fail to properly grip a stem, as when a leaf is not properly placed upon the feed belt, the leaf is carried about the drum in a normal flat extended position such that it is picked up between belts 4 and 48 and carried further about the drum to the point of separation of these belts. Thus any leaves not properly stemmed are segregated from the stemmed leaves and are collected to be re-run through the machine. The stemmed leaves drop upon separation of belt 42 from pulley 6 while any remaining unstemmed are carried to the point of separation of belt 48 from belt 4.

Referring particularly to Figure 2, a frame 1b fixed with frame 1 journals by means of shaft 49a, a large stemming drum 49 of about the same diameter as drum 2. The two drums are mounted and journaled to rotate in respective planes making an acute angle and with their peripheries closely adjacent at about the point where the leaves begin to pass upwardly about drum 2 beneath cardcloth belt 34. Preferably the two drums are driven synchronously by bevel gearing 50. If desired, universal joints, not shown, may be substituted for this gearing.

The periphery of drum 49 is arcuately concave in planes through the axis thereof as indicated at 49a, Figure 10, and has a facing 49b of rubberized fabric secured thereto. The relation of the parts is such that the surface element of the periphery of drum 49 at its point of closest approach to drum 2, is about one-half the dihedral angle between the planes of the two drums. That is to say, a line in the periphery of drum 2 through said point and parallel with the axis of the drum, will be inclined at a small angle to the corresponding line in the adjacent surface of drum 49, as shown upon Figure 10, whereby the stem when gripped to the stemming drum is bent slightly but at a lesser angle than would be the case if the surface of drum 49 were cylindrical.

A rubber belt 51, which may be a V-belt, Figures 6 and 10, is guided over and about the upper half of drum 49 with its wider face contacting the rubber facing of the drum. Starting with idler 52 journaled in frame portion 1b, this belt passes upwardly over and about the inner edge of the periphery of the drum (see Figure 10), outwardly and forwardly beneath a secondary stripping drum 53, upwardly and rearwardly over idlers 54 and 55 and downwardly beneath idler 52. A tightening idler 56 is journaled on a lever 57 pivoted at 57a in frame 1b and weighted at 58 for operation in a manner obvious from inspection of Figure 6 to maintain belt 51 taut. Idler 52 and secondary stripping drum 53 are positioned so that their axes are parallel to the transverse surface elements of drum 49 at the respective points where they guide the belt into contact with the drum 49. By such construction the belt 51 remains at all times in alignment with the edge of the drum and in contact with rubber facing 49b as indicated upon Figure 10.

As the leaves begin their movement upwardly over and about drum 2, their stems are firmly gripped at the butt ends between belt 51 and the rubber facing 49b of drum 49 and pulled from the leaf portions as the peripheries of the two drums separate. The leaf portions remain upon the main drum 2 and are held by and between the cardcloth elements 33 and 34 and also between belts 4 and 32 until they pass over the top of the drum.

While the greater part of the usable leaf portions remain with the main drum, a certain residue of leaf unavoidably adheres to the stems at their butt ends and, in prior art machines of this character, have been discarded with the stems. To recover this residue I have provided a mechanism shown upon Figures 2, 6, 7 and 8, now to be described.

The stems are carried with drum 49, beneath belt 51 and, as will be understood, the main portion of each stem projects therefrom where it has been pulled from the leaf. Referring to Figure 7, idler or drum 53 about which belt 51 passes, is constructed to have, in addition to a groove for the reception of the belt, a coaxial cylindrical portion in side-by-side relation with the belt groove and having a cardcloth facing 53a. Drum 53 is journaled in frame part 1b and is set parallel to the contiguous arcuate periphhery of drum 49 whereby belt 51 is guided along the periphery of the drum as previously explained and as shown in Figure 10. From Figure 7 it is noted that a cardcloth belt 60 passes about the lower half of drum 53 in contact with its cardcloth facing, thence outwardly and forwardly about an idler 61, downwardly about idler 62 and upwardly about idler 63 back to the drum. Since belt 60 meets the drum 53 at the point where belt 51 begins its traverse thereabout, the stems are here picked up at a point removed from their butt ends and gripped between drum 53 and belt 60. A pair of pickers or cleaning pulleys 64 and 65 are driven by contact with belt 51 and are positioned with their pins or bristles in contact with belt 60, to clean the same, as described in connection with picker 44, Figure 5.

Figure 2 shows the angular relation between idler or drum 53 and a de-butting mechanism 66 positioned between the idler and main drum 2 and which may rotate on an axis parallel with the main drum. Referring to Figure 8 this mechanism is carried by a bar 1d fixed to part 1c of the frame and consists essentially of a secondary stemming drum 67 of about the same diameter as drum 53 and journaled in frame part 1c. A belt 68 passes beneath and about the lower half of the cylindrical periphery drum 67, then about idlers 69, 70 and 71 arranged as shown in Figure 8 and mounted on brackets fixed with cross bar 1d on frame part 7c. See Figure 6. Drum 53 is driven from drum 49 by belt 51. Shaft 66a is conveniently driven from the shaft of idler 53 by a coupling 70a which may be a coil spring such as those used with automobile starting motors.

Figure 2 shows that the two secondary drums 53 and 67 are so mounted that their peripheries are contiguous at a point lying substantially in the horizontal plane of their axes so that as the stems passing over and about drum 49 are released by the separation of belt 51 therefrom as it turns about drum 53, they are immediately picked up and gripped at two points closely adjacent their butt ends, first, between belt 60 and the cardcloth facing 53a of drum 53 and secondly, between V-belt 68 and the face of pulley 67 contacted thereby. Then as the peripheries of drums 53 and 67 separate, the residue of leaf portions remaining adherent to the stems is stripped therefrom by cardcloth belt 60 and the cardcloth facing of idler 53, while the stems are pulled by the gripping action between belt 68 and the periphery of pulley 67. The residue leaf portions thus removed are released on separation of belt 60 from drum 63 as the belt passes about idler 61, and fall for collection and subsequent use. Likewise the stems are released as belt 68 separates from drum 67, as this belt begins its pass about idler 69, and fall into a collector, not shown.

At Figure 12 I have shown a mechanism for guiding and momentarily retarding the leaf ends as they pass from feed belt 11 to the pick-up belts. A bracket 72 has one end pivotally secured to the side edge of table 13 and projects forwardly a little ahead of roller 14, terminating in a sleeve 72a. A rod 73 is rotatably and slidably secured in the sleeve by a set screw 74. Rod 73 has a plurality of upwardly-curved fingers or hooks 75, four as shown, fixed in parallel relation at spaced intervals therealong and which extend forwardly of feed belt 11. Rod 73 is thus positioned in the space between rollers 9 and 14 so that as the leaves pass off belt 11 and are speeded up as their stems are engaged between belts 27 and 34, the main portions of the leaves are slightly and momentarily retarded by the upwardly-curved fingers and pass to the pick-up belts in a position generally perpendicular to the direction of movement.

In Figure 4 there is shown in dotted lines the nozzle 76 of a blower mechanism. This nozzle is positioned about in the plane of belt 27 between pulleys 9 and 10 and operates to direct a blast of air along and between these pulleys across belt 4. The action of the blast is to assist in transferring leaves evenly and smoothly to the pick-up belts. It is contemplated that both the guide means of Figure 12 and the blower may be provided and used substitutionally or conjointly as may be desired or as conditions of use may dictate.

With the machine in operation, the operator takes bunches or hands of leaves, removes the ties by which they are bound and places them on feed belt 11 about as shown upon Figure 2, with the butt ends of their stems across belt 22 and in contact with the vertical surface of the frame closely adjacent and parallel with belt 22 opposite belt 11, and spreads or separates the stems slightly. In Figure 2 the individual leaves shown may each represent a hand or bunch of leaves. No great separation of the leaves is required so that the operator can largely confine his attention to proper positioning of the leaves transversely of the belts.

As each leaf passes off belt 11 its stem remains on belt 22 and is moved, aided by the action of disc 22a, between belts 25 and 30 which act to greatly increase the speed of each leaf. Shortly after the stem end of each leaf begins its travel between belts 25 and 30 it passes between and is gripped by the superposed passes of belt 27 and cardcloth belt 34 which are moving at the same speed as belts 25 and 30. Prior to the separation of belts 27 and 34 the main or body portions of the leaves pass between the wide flat belts 4 and 32 by which they are carried upwardly about pulley 10 to a point where they begin travel about drum 2.

At this point the butt ends of the steps pass between belt 51 and stemming drum 49 and are gripped thereby to the periphery of the drum. At the same time the leaves pass between cardcloth elements 33 and 34 and are carried with them about the periphery of drum 2. As the peripheries of the two drums separate, the stems are forcibly pulled out through the superposed cardcloth elements. The action of these is to strip the leaf from the stems and to carry the leaf over and about the drum 2 which action is aided to some extent by belt 32.

The stemmed leaves are more or less crumpled against the cardcloth belt and drop off at the forward side of the drum when belt 42 separates therefrom. Should any leaves remain unstemmed, for examples as the result of improper placement upon the feed belt, they are picked up between belts 4 and 48 and carried to the point where these belts separate as the latter turns about pulley 45. At this point they drop and may be collected at intervals and re-run through the machine.

The stems are carried over and about drum 49 beneath belt 51. As this belt begins travel about and beneath drum 53, the stems pass between cardcloth belt 60 and the faced section of this drum. At the same time the stems are firmly gripped at a point further toward the tips, between drum 67 and belt 68. Since drums 53 and 67 rotate in respective planes making an acute angle the butt ends of the stems are pulled from between cardcloth belt 60 and the card cloth facing of drum 53 so that any residue leaf remaining upon the stems at the butt ends is removed and drops when the belt separates from the drum. Likewise the stems are released when belt 68 separates from drum 67. The angular relation between drums 53 and 67 may be the same as that between drums 2 and 49. It will be noted that in accordance with the method carried out by my invention, the stems are first gripped at their butt ends and pulled in one direction between cardcloth to remove the major part of the leaf portions, then subsequently gripped at a point upward or removed from the butt ends and the latter pulled between cardcloth in the opposite direction to remove any leaf portions remaining adherent to the stem at or near its butt end. The machine as embodied in the model shown operates smoothly and rapidly and recovers practically all of the usable leaf so that there is substantially no loss of usable leaf.

While I have disclosed my invention in a form presently preferred by me, many variations and substitutions of equivalents will occur to those skilled in the art after a study of the foregoing disclosure. Consequently such disclosure is to be taken in an illustrative rather than a limiting sense; and it is my desire and intention to reserve all changes, modifications and substitutions of equivalents within the scope of the subjoined claims.

In the claims, the term "leaf portion" means the usable parts of the leaf only and is to be interpreted as exclusive of the stems. The term "leaf" or "leaves" is to be interpreted to include both the leaf portions and the stems. The term "removed from" means "near but not coincident with." The term "secondary" as used in connection with the drums, refers to elements 53 and 67 or equivalents.

Having now fully disclosed my invention, what I claim and desire to secure by Letters Patent is:

1. A tobacco stemming machine comprising, a pair of main drums of substantially the same diameter journaled to rotate in respective planes related at an acute angle and with their peripheries adjacent at a first point, a pair of secondary drums journaled to rotate in respective planes related at an acute angle and adjacent each other and one of said main drums at a second point in the plane of rotation thereof, means feeding tobacco leaves to said first point, means rotating with said main drums and gripping tobacco leaves thereto at their stem ends, means rotating with said secondary drums and gripping tobacco stems thereto on release from said one main drum, and means rotating all said drums in unison.

2. In a tobacco stemming machine, a frame, a first stripping drum, a first stemming drum, said first drums being of substantially the same diameter, means journaling said drums in said frame for rotation in respective vertical planes making an acute angle and with their peripheries contiguous at a first point, means rotating said drums in unison, means operable to grip the stems of tobacco leaves to the periphery of said stemming drum at said point, means operable to grip the leaf portions of tobacco leaves to the periphery of said stripping drum at said point, whereby the stem of each leaf is pulled therefrom as said drums rotate, a second stripping drum, a second stemming drum, said second drums being of a diameter less than that of said first drums, means journaling said second drums in said frame between said first drums and for rotation in respective planes making an acute angle and with their peripheries closely adjacent each other and said first stemming drums contiguous to a second point remote from said first point, means gripping stems to the peripheries of said second drums adjacent said second point on release from said first stemming drum, and means driving said second drums in unison and in timed relation with said first drums.

3. In a tobacco stemming machine, a frame, a main stemming drum journaled on a horizontal axis in said frame, a secondary stripping drum journaled in said frame with its periphery adjacent the periphery of said main stemming drum at a point, a secondary stemming drum journaled in said frame with its axis at an obtuse angle to the axis of said secondary stripping drum and with its periphery closely adjacent thereto at said point, a stemming belt extending about one-half the circumference of said main stemming drum to said point, thence about a portion of said secondary stripping drum, idler means guiding said belt back to the other side of said main stemming drum, and power means rotating all said drums in unison.

4. In a tobacco stemming machine, a frame, a main stemming drum journaled in said frame, a secondary stripping drum journaled in said frame with its periphery closely adjacent the periphery of said main stemming drum at a first point, a stemming belt extending about portions of said main stemming drum and said secondary stripping drum, a secondary stemming drum journaled in said frame at an acute angle with said secondary stripping drum and with its periphery closely adjacent thereto at said first point, means feeding the stems of tobacco leaves between said main stemming drum and said belt at a point remote from said first point, means gripping the stems to the peripheries of said secondary drums adjacent said first point as they pass from said main stemming drum, means connecting said secondary drums for rotation in unison, and power means operable to drive said main stemming drum.

5. In a tobacco stemming machine, a frame, a main stripping drum, a main stemming drum, means journaling said drums in said frame for rotation in planes related at an acute angle and with their peripheries contiguous at a first point, a secondary stripping drum journaled in said frame with its periphery adjacent said main stemming drum at a second point remote from said first point, a secondary stemming drum journaled in said frame at an acute angle with said secondary stripping drum and closely adjacent thereto at said second point, a stemming belt extending about the periphery of said main stemming drum between said points thence about a portion of said secondary stripping drum, idler means guiding said stemming belt back to said first point, means feeding tobacco leaves to said main drums at said first point with their stem ends between said stemming belt and the periphery of said main stemming drum, means gripping the leaf portions of said leaves to said main stripping drum at said first point, means gripping the stems to said secondary drums at said second point, and power means driving all said drums in unison.

6. A tobacco stemming machine comprising a frame, a stripping drum, a stemming drum, means journaling said drums in said frame for rotation in vertical planes related at an acute angle and with their peripheries adjacent at a point in the horizontal plane of their axes of rotation, a cardcloth facing secured about the peripheral edge of said stripping drum next to said stemming drum, a first feed belt, spaced feed rollers mounting said belt for linear travel toward said stripping drum in a pass between said rollers, first and second pick-up pulleys journaled in said frame between one said feed roller and said stripping drum, a wide belt passing about said stripping drum and around said first pick-up pulley and beneath and about said second pick-up pulley, a second feed belt passing in spaced side-by-side relation with said pass of the first feed belt and about an idler coaxial with said first pick-up pulley, a cardcloth belt, idler means guiding said cardcloth belt in a pass in side-by-side parallelism with the pass of said wide belt between said pick-up pulleys, thence over and about the upper half of said stripping drum in contact with the cardcloth facing thereof beginning at said point, belt means guided for contact with said cardcloth belt in its pass between said pick-up pulleys, means moving with said stemming drum to grip the stems of tobacco leaves to the periphery thereof at said point for travel about the upper half of said stemming drum, and power means driving said feed belts at one linear speed and said drums and pulleys at a second linear speed greater than said first linear speed and having a predetermined ratio therewith.

7. In a tobacco stemming machine, a frame, a stripping drum, a stemming drum, means journaling said drums in said frame for rotation in respective vertical planes making an acute dihedral angle and with their peripheries closely adjacent at a first point, means connecting said drums for synchronous rotation, a stripping belt, a stemming belt, means guiding said belts into contact with the respective drums at said first point and thereover about the upper halves thereof and along their contiguous peripheries, idler means guiding said stripping belt out of contact with said stripping drum at a second point remote from said first point, first and second pulleys journaled in said frame forwardly of said stripping drum, a first flat belt passing about said stripping drum in laterally spaced relation with said stripping belt, thence outwardly beneath said first pulley, over said second pulley and back beneath said stripping drum, a second flat belt, idler means guiding said second flat belt in a pass contacting said stripping drum in the space between said first flat belt and said stripping belt, said pass extending over a peripheral portion of said stripping drum including and extending beyond said second point, and means feeding tobacco leaves to said first point to be gripped at their stem ends to the drums by said stripping and stemming belts respectively.

8. A tobacco stemming machine comprising a frame, a stripping drum, a stemming drum, means journaling said drums in said frame with their peripheries adjacent at a point and rotatable in respective vertical planes related at an acute angle, said drums extending from said point in the same direction, means connecting said drums for rotation in unison, a stripping belt, a stemming belt, means guiding each belt into contact with the adjacent periphery of a respective drum over a portion of its circumference beginning at said point and extending in the direction of rotation, and means feeding the stem ends of tobacco leaves to said drums at said point, between each belt and its respective drum, said stemming drum being arcuately concave in radial cross section to have a peripheral surface of gradually and uniformly decreasing radius from its edge adjacent said stripping drum, said guiding means including means maintaining an edge of said stemming belt coincident with the peripheral edge of said stemming drum.

9. In a tobacco stemming machine, a frame, a stripping drum, a stemming drum, means journaling said drums in said frame for rotation in respective vertical planes related at an acute angle and with their peripheries closely adjacent at a point, first and second pulleys journaled in said frame adjacent and rearwardly of said stripping drum on axes parallel therewith, a feed belt passing about said first pulley, a stripping belt passing about said second pulley and said stripping drum, means connecting said drums for rotation in unison, power means driving said pulleys at a predetermined speed ratio, the speed of said second pulley being greater than that of said first pulley, pick-up means transferring leaves from said feed belt to said stripping belt and including a rod adjustably fixed with said frame and extending transversely between said pulleys, a plurality of parallel, upwardly-curved fingers secured to and along said rod in spaced relation, and means gripping leaves to the respective drums at said point.

10. A tobacco stemming machine as recited in claim 9, and a blower nozzle positioned to direct a stream of air transversely of and over said stripping belt between said pulleys.

References Cited in the file of this patent
UNITED STATES PATENTS

| | | |
|---|---|---|
| 569,575 | Coffee | Oct. 13, 1896 |
| 671,845 | Whitaker | Apr. 9, 1901 |
| 961,746 | Morris | June 14, 1910 |
| 1,852,148 | Candle | Apr. 5, 1932 |
| 2,557,540 | Isley | June 19, 1951 |